United States Patent
Henderson et al.

[11] Patent Number: 5,950,683
[45] Date of Patent: Sep. 14, 1999

[54] PIPE REPAIR ASSEMBLY

[76] Inventors: Gerald Henderson; Jacques Fontaine, both of 12 716 Industriel Boul., Montréal, Canada

[21] Appl. No.: 08/988,802

[22] Filed: Dec. 11, 1997

[51] Int. Cl.$^6$ .................................................. F16L 55/16
[52] U.S. Cl. .............................. 138/99; 138/97; 285/15; 285/373
[58] Field of Search .................... 138/99, 97; 285/15, 285/373; 156/94; 264/36.1

[56] References Cited

U.S. PATENT DOCUMENTS

| | | | |
|---|---|---|---|
| 2,225,208 | 12/1940 | Crickmer | 285/194 |
| 2,417,741 | 3/1947 | Dillon | 138/99 X |
| 2,459,251 | 1/1949 | Stillwagon | 285/194 |
| 3,223,439 | 12/1965 | Stevens | 285/194 |
| 3,954,288 | 5/1976 | Smith | 285/373 X |
| 4,096,886 | 6/1978 | Daspit | 138/99 |
| 4,111,234 | 9/1978 | Wells et al. | 138/99 |
| 4,652,023 | 3/1987 | Timmons | 285/373 X |
| 4,653,782 | 3/1987 | Munday | 285/373 |
| 4,768,813 | 9/1988 | Timmons | 285/373 |
| 4,819,974 | 4/1989 | Zeidler | 285/373 |
| 4,895,397 | 1/1990 | Miller | 285/419 |
| 5,118,139 | 6/1992 | Lott | 285/15 |
| 5,288,108 | 2/1994 | Eskew et al. | 285/15 |
| 5,301,983 | 4/1994 | Porowski | 285/10 |
| 5,362,107 | 11/1994 | Bridges | 285/373 X |
| 5,375,888 | 12/1994 | Ideda | 285/15 |

FOREIGN PATENT DOCUMENTS

| | | | |
|---|---|---|---|
| 1024913 | 1/1978 | Canada | 189/27 |

*Primary Examiner*—Patrick Brinson
*Attorney, Agent, or Firm*—Walter W. Duft

[57] ABSTRACT

A pipe repair assembly for sealing leaks in pipelines that transmit oil, chemicals, steam and the like, is disclosed. The assembly is in the form of a two-part sleeve which forms an enclosure or box over a section of leaking pipe. The sleeve includes a pre-fitted sealing jacket to provide a snug fit over the pipe contour. Optionally, the assembly may have a channel or groove transverse to the longitudinal axis of the sleeve and spaced inwardly of the ends of the sleeves for receiving a floating metal ring and a ring of sealant material. The floating ring, sealant ring and sealing jacket are all compressed when bolts connecting the two parts of the sleeve are secured.

7 Claims, 3 Drawing Sheets

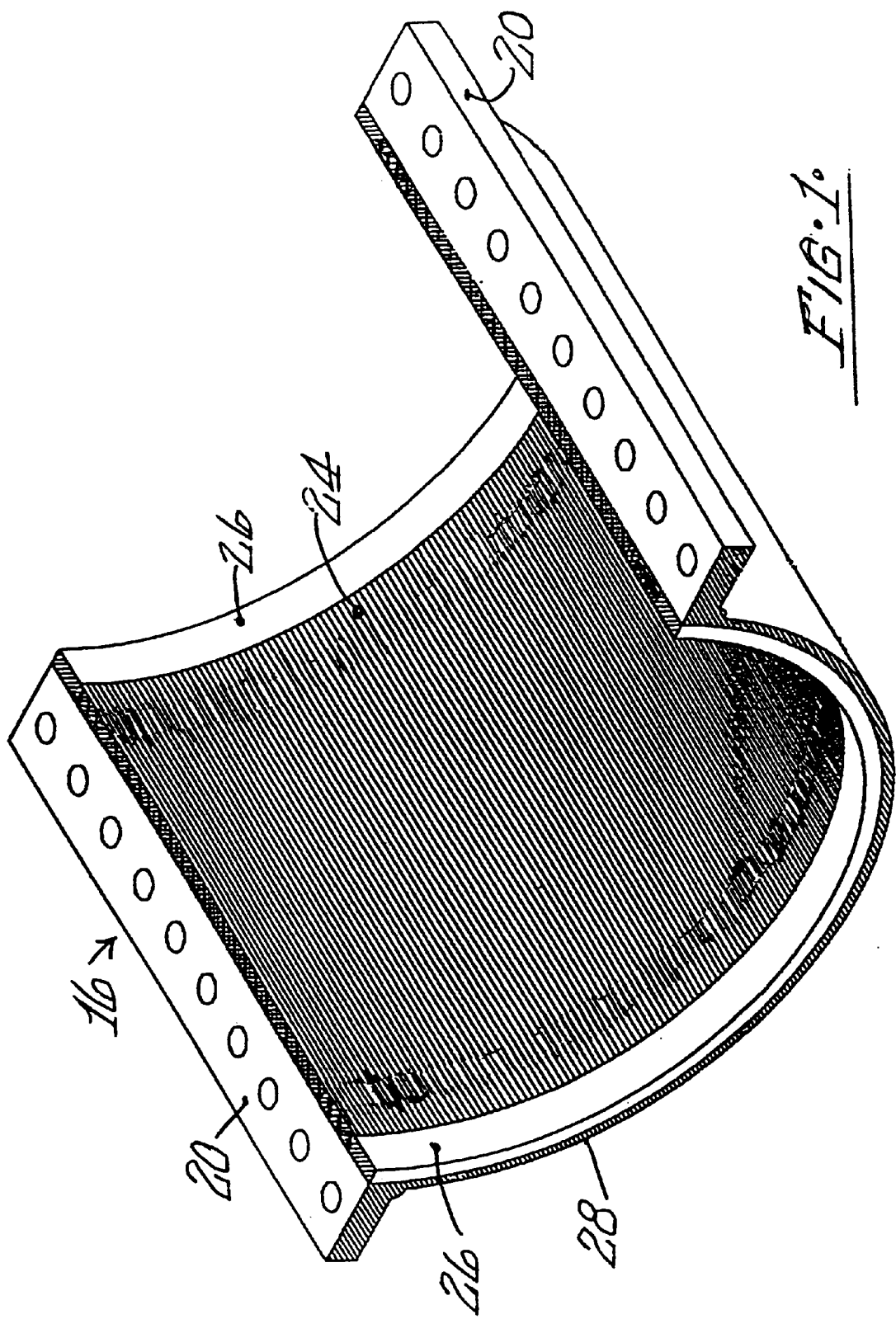

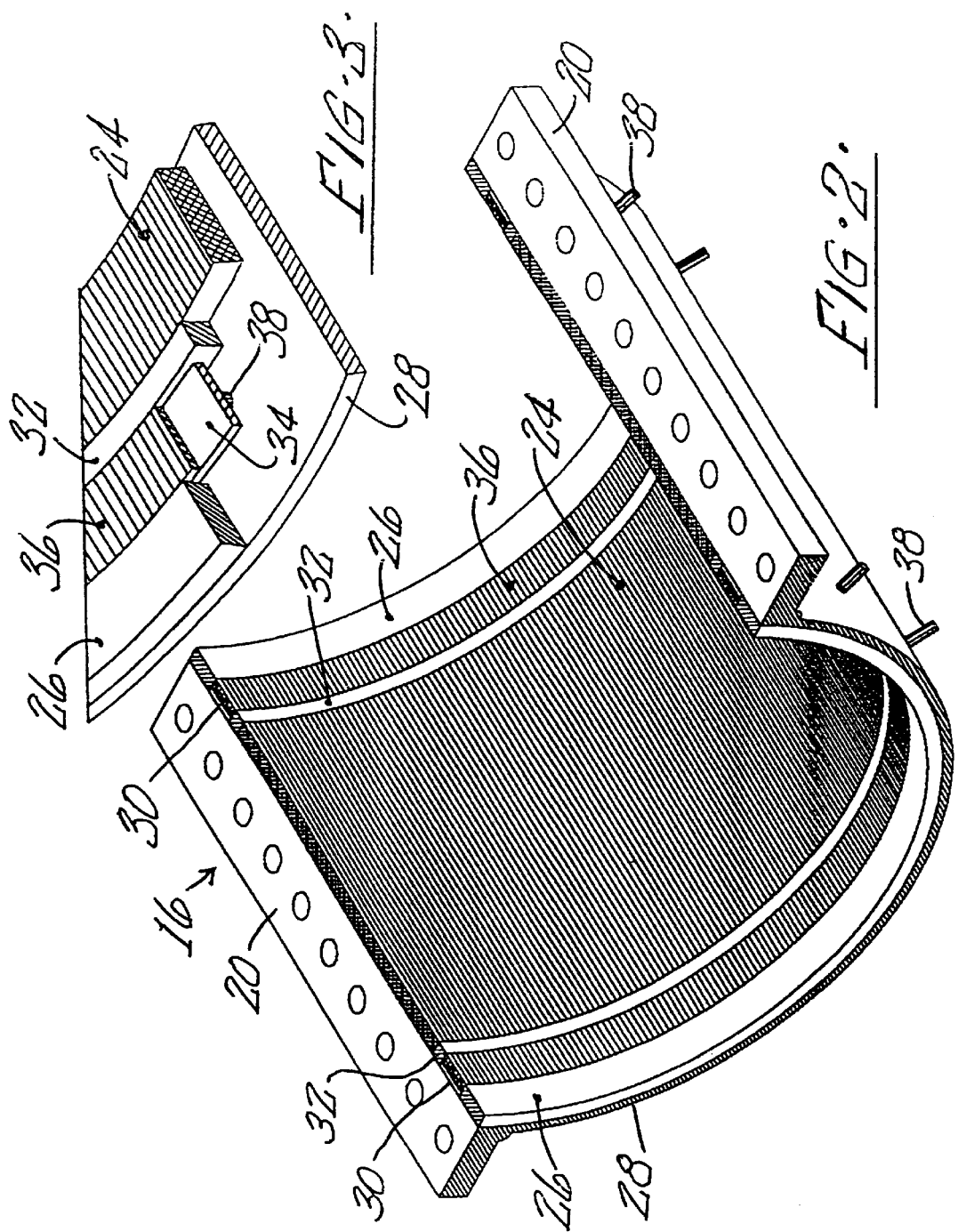

PIPE REPAIR ASSEMBLY

FIELD OF THE INVENTION

This invention relates to the repair of leaks in pipelines and, in particular, to a pipe repair assembly for sealing such leak.

BACKGROUND OF THE INVENTION

Leakage in pipelines is a fairly wide spread problem and, in Canada and other countries with a harsh winter climate, the problem is one of increased frequency during the winter months due to the results of deep frost penetration. Moreover, older pipelines are very susceptible to leakage and fracture due to a variety of reasons in addition to movement in the lines caused by frost. It is often necessary to carry out pipeline repairs on short notice depending on the fluid or gas carried by the pipeline as environmental damages and other serious problems can result from a fracture and leak.

Conventional repair procedures can be a very expensive and time consuming in their applicability to a pipeline where a leak has occurred. There are several conventional approaches to the problem and while most of these approaches include a clamp that consists of a pair of complementary members in the form of two half-shells or half-sleeves, bolted together over the area of the leak, there are substantial differences with respect to the material used intermediate the half-shells and the surface of the pipe in the vicinity of the leak. In many cases, an annular web of material is wrapped around the area of the leak before the half-shells are applied thereover and secured together.

Another common approach is to incorporate the half-shells of a type that are capable of carrying a fluid under pressure and then injecting a high pressure sealing medium into the annular space between the interior of the half-shells and the exterior of the pipe, the pressure of the sealing medium being greater than that in the pipe.

Yet another approach utilizes a pair of mating coupler or clamping members that operate with a semi-circular liner that is inserted into the coupler members before they are clamped together to effect the seal.

Many of the conventional approaches, some of which are mentioned above, result in an expensive solution to the problem at hand due to the number of physical elements involved in the approaches and the time required in the procedures of applying those solutions. Some examples of these conventional approaches may be found in U.S. Pat. No. 4,819,974, Zeidler, Apr. 11, 1989; U.S. Pat. No. 4,768,813, Timmons, Sep. 6, 1988; and Canadian Patent 1,024,913, The Pipe Line Development Company, of Jan. 24, 1978.

SUMMARY OF THE INVENTION

The present invention addresses the problems of repairing a leak in a pipeline in a practical, effective and relatively inexpensive procedure. In accordance with the invention, a pipe repair asssembly applies pressure on the leaking hole in the pipe and not a gasket or seal. This, in effect, stops the leak at the point of origin thereby eliminating pressure points on a gasket. In accordance with the invention, it is not necessary to inject a sealant into the annular area between the interior of the clamping members and the exterior of the pipe which would also require the blowing out of the liquid being carried by the pipeline. In the present invention, the sealant is in the form of a jacket molded onto the interior surfaces of the half-sleeve clamping members. This has the advantage that the sealing jacket may be longer and thinner than conventional sealing gasket arrangements because conventionally, the sealing gasket, in combination with the clamping members, normally acts as a pressure vessel and requires an appropriate thickness to deal with the pressure of the pipeline. Conversely, with the sealant already in place in the form of a jacket molded onto the clamping members as in the present invention, the primary pressure point is at the origin of the leak and therefore a sealing jacket in accordance with the invention does not act as a pressure vessel in the same way as a conventional leak sealing system.

According to a broad aspect, the invention relates to a pipe repair assembly for sealing leaks in a pipeline. The assembly comprises a pair of half-sleeves each having a pair of mounting flanges along its side edges that are adapted to align with like flanges on the other half-sleeve of the assembly. The half-sleeves have a length sufficient to enclose a leak area in a pipeline and a jacket of sealing material is pre-fitted to the half-sleeves to provide a snug fit over the surface of the pipeline when the half-sleeves are positioned thereon. Each half-sleeve has one half of a circumferential outer steel compression ring secured to the inner surface of the half-sleeve adjacent the end edges thereof and securing means are provided to clamp the flanges of the half-sleeves in face-to-face relationship to form the complete assembly.

In accordance with a further broad aspect, a circumferential channel is provided adjacent each end of the half-sleeves between the terminal and edges of the sealing material jacket and the inner edge of the outer compression ring. Each of the channels include an inner compression ring adjacent the outer edge of the sealant material jacket and, between the inner and outer compression rings, a floating seal ring with a secondary jacket of sealing material secured thereto.

BRIEF DESCRIPTION OF THE DRAWINGS

The invention is illustrated by way of example in the accompanying drawings in which:

FIG. 1 is a perspective view of a half-sleeve of a pipe repair assembly according to the invention;

FIG. 2 is a view similar to FIG. 1 but illustrating another embodiment of the invention;

FIG. 3 is a fragmentary, detailed view of a portion of the half-sleeve shown in FIG. 2.

DETAILED DESCRIPTION

Figure 4:
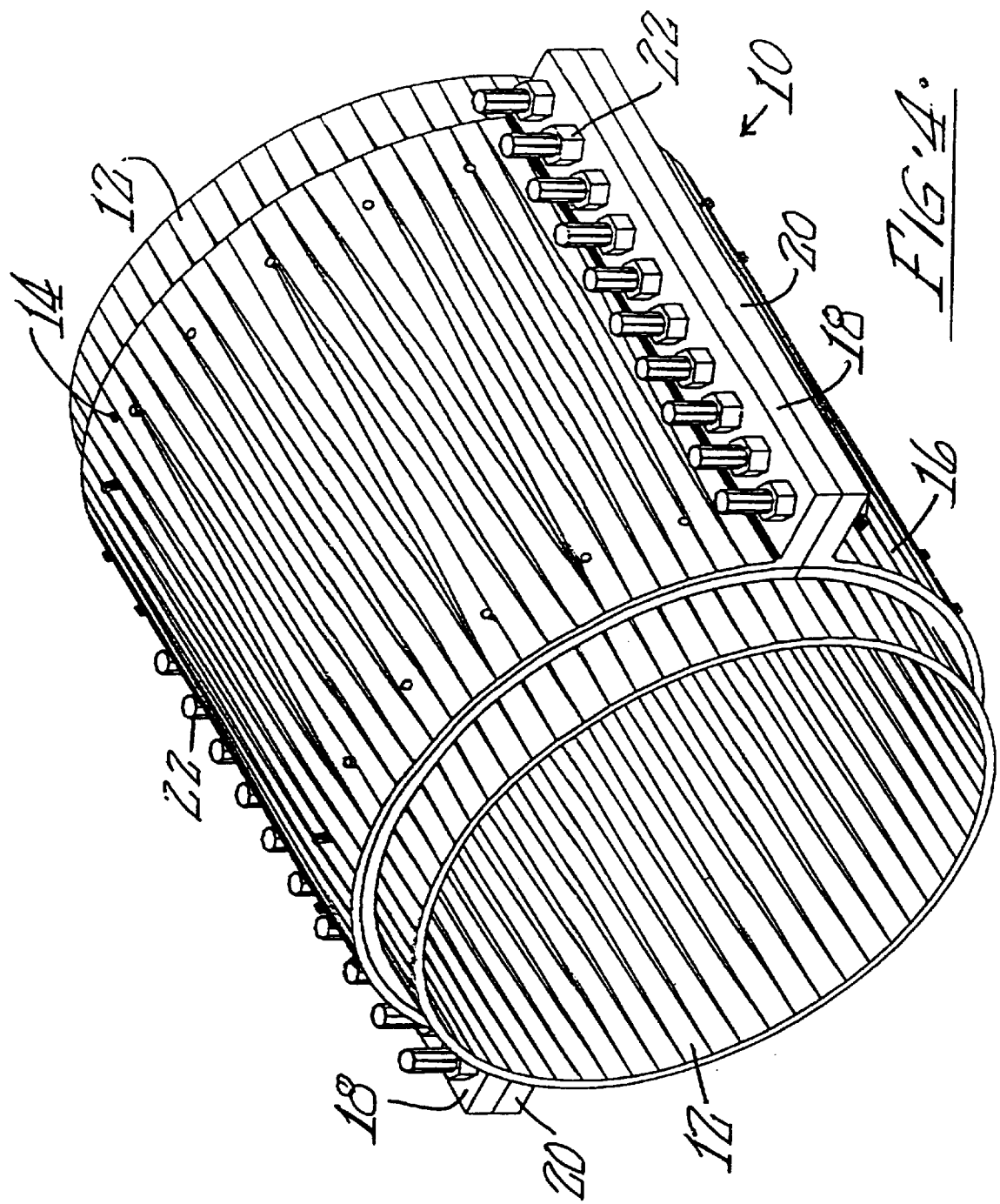
FIG. 4 is a perspective view of a repair assembly according to the invention secured around a pipe.

Referring initially to FIG. 4, a pipe repair assembly according to the invention is illustrated at 10 secured over a length of pipe 12. The upper and lower half-sleeves 14 and 16 each have a pair of mounting flanges, illustrated at 18 on the upper half-sleeve 14 and 20 on the lower half-sleeve 16. These mounting flanges are drilled to receive bolts 22, the size and quantity of which are determined by the length of the sleeve and its pressure rating according to the ASME boiler pressure vessel code. The width and thickness of the half-sleeves and that of the flanges 18 and 20 are determined by the same code.

The half-sleeves 14 and 16 are of a length sufficient to enclose the area of leakage in the pipe 12. In an examples such as that shown in FIG. 4, pipe 12 could be 30 inches or 76 centimeters in length.

Looking now at FIG. 1, the lower half-sleeve 16 is illustrated, the upper half-sleeve 14 (not shown) being identical. The half-sleeves are provided with a jacket 24 of sealing material and which is pre-fitted to each of the half-sleeves so as to provide a snug fit over the surface of the pipeline when the two half-sleeves are assembled together on the pipe as in FIG. 4. While materials other than steel may be useful in a repair assembly according to the invention, the half-sleeves may for example be fabricated from a rolled steel plate or a section of pipe that conforms to the ASME standards and its inside diameter will be determined by the thickness of the sealant jacket 24 that is required for the job at hand. Again, as an example, the sealant would be approximately 1 inch or 25.5 millimeters thick, the box length being determined by the size of the damaged area. The mounting flanges 20 are welded along the edges of each half-sleeve and are drilled to accommodate the studs or bolts 22 required to secure the two half-sleeves together in the assembled position of FIG. 4.

The sealant material jacket 24 maybe manufactured from a variety of materials although Kevlar™ fibres mixed with silicon sealant would be one that would be commonly used, due to its resistance to a wide variety of chemicals and an acceptable range in operating temperatures. Other types of fibres could be used such as graphite fibres and Teflon™ fibres blended with other types of adhesives to form a sealant jacket inside the sleeves. The sealant jacket 24 is molded inside the entire half-sleeve and will, for example, due to its thickness, reduce the "at rest" inside diameter of the half-sleeve by approximately 0.125 inches or 3.2 millimeters to provide a desired pressure seal with the components assembled as in FIG. 4.

Each half-sleeve includes one half of a circumferential outer steel compression ring 26 secured to the inner surface of the sleeve adjacent the end edges 28 thereof. Rings 26 are welded to the inside of the sleeve and machined down to conform to the outside diameter of the pipe to be repaired. As an example, the width of rings 26 would be approximately 2 inches or 51 millimeters or more.

Turning now to FIGS. 2 and 3, another embodiment of the invention is illustrated. In this embodiment, the area of the inside of the sleeve adjacent the compression rings 26 is altered to accommodate a further sealing member. Accordingly, a space is provided between the outer end edges of the sealant jacket 24 and the compression rings 26 and this space forms a circumferential channel 30 intermediate the jacket 24 and the rings 26 in which two further rings are provided. As shown clearly in FIG. 3, a secondary metal compression ring 32 now defines the end edges of the sealant jacket 24 and a floating ring 34 is located between the secondary compression ring 32 and the main compression ring 26. Floating ring 34 is provided with its own sealant jacket 36. The thickness of this floating ring would, for example, be 0.250 inches or 6.3 millimeters. The secondary compression ring 32 is of reduced width in comparison to the ring 26 and is say 0.750 inches or 19 millimeters. This ring is meant to move radially inwardly against selected surface areas of the pipe in response to external pressure created by jacking studs acting against the outer circumferential face of the floating ring 36.

The jacking studs or screws 38 are located on the outside of the sleeve, radially in line with the floating ring which has been adhesively secured to the inner surface of the sleeves 14, 16. The size and quantity of the jacking studs would be determined by several factors but, as an example, they would be of 0.500 inches or 12 millimeters or larger with a distance of 4 inches or 100 millimeters between them on the outer circumference of the sleeves. The jacking studs 38 can be used in the event that the line being covered has been crushed, damaged or corrosion has changed the diameter of the line. The floating ring then provides a secondary seal. The jacking screws 38 are turned inwardly to move the floating ring tightly against the surface of the pipe thereunder.

It will be appreciated that the present invention provides an uncomplicated, efficient device for the repair of a leaking pipe. The sealant is pre-fitted into the half-sleeves thereby avoiding the lengthy and complicated step of injecting a sealant into a space between the outer sleeves and the pipe. By having the pre-fitted sealant in place when the assembly is secured against the outer surface of the pipe, it ensures that the pressure point of the sealant is on or in the leaking hole in the pipe and not on the gasket and seal which is the case when a large circumferential space is formed by the sleeves into which a sealant must be injected. With the present invention, the compression from the seal jacket is applied directly over the hole and stops the leak at that point to eliminate any outwardly directed pressure points on the end seals.

The repair assembly according to the invention is lighter in weight than conventional repair assemblies and this enables workmen to install the assembly using less lifting equipment than is ordinarily needed. The assembly may be installed quickly due to the fact that it incorporates relatively few moving parts as compared to some of the conventional arrangements.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. A pipe repair assembly for sealing leaks in a pipeline, said assembly comprising a pair of half-sleeves each having a pair of mounting flanges along its side edges adapted to align with like flanges on the other half-sleeve of said assembly, said half-sleeves having a length sufficient to enclose a leak area in said pipeline; a jacket of sealing material pre-fitted to said half-sleeves to provide a snug fit over the surface of said pipeline when said half-sleeves are positioned thereon;

each said half-sleeve having one half of a circumferential outer steel compression ring secured to said inner surface adjacent the end edges thereof; and securing means to clamp said flanges of said half-sleeves in face-to-face relation ship to form said assembly.

2. A pipe repair assembly according to claim 1 including a circumferential channel adjacent each end of said half-sleeves between the terminal and edges of said sealing material jacket and the inner edge of said outer compression ring; each said channel including an inner compression ring adjacent the outer edge of the sealant material jacket and, between said inner and outer compression rings, a floating seal ring with a secondary jacket of sealing material secured thereto.

3. A pipe repair assembly for sealing a leak in a pipeline, said assembly including a pair of half-sleeves adapted to be clamped together over a section of pipeline to form a sealing sleeve over a leaking area therein; each of said half-sleeves comprising:

a pair of mounting flanges along the side edges thereof adapted to align with like flanges on the other sleeve half of said pair thereof when said half-sleeves are assembled, said half-sleeves having a length sufficient to enclose said leaking area;

a jacket of sealing material pre-fitted to said half-sleeves to provide a snug fit over the surface of said pipeline when said half-sleeves are assembled thereon;

each said half-sleeve having one half of a circumferential outer steel compression ring secured to said inner surface adjacent the end edges thereof;

a circumferential channel adjacent each end of said half-sleeves between the terminal end edges of said sealing material jacket and the inner edge of said outer compression ring;

each said channel including an inner compression ring adjacent said outer edge of the sealant material jacket and, between said inner and outer compression rings, a floating seal ring with a secondary jacket of sealing material secured thereto.

4. A pipe repair assembly according to claim 3 and including a plurality of jacking screws located in the walls of the half-sleeves and extending therethrough to engage the outer surface of the floated seal ring.

5. A pipe repair assembly according to any one of the preceding claims wherein said jacket of sealing material comprises Kevlar fibres incorporating a silicon sealant.

6. A pipe repair assembly according to any one of the preceding claims wherein said jacket of sealant material comprises graphite fibres or Teflon fibres blended with an adhesive.

7. A pipe repair assembly for sealing a leak in a pipeline, said assembly including a pair of half-sleeves adapted to be clamped together over a section of pipeline to form a sealing sleeve over a leaking area therein; each of said half-sleeves comprising:

a pair of mounting flanges along the side edges thereof adapted to align with like flanges on the other sleeve half of said pair thereof when said half-sleeves are assembled, said half-sleeves having a length sufficient to enclose said leaking area;

a jacket of sealing material pre-fitted to said half-sleeves to provide a snug fit over the surface of said pipeline when said half-sleeves are assembled thereon;

each said half-sleeve having one half of a circumferential outer steel compression ring secured to said inner surface adjacent the end edges thereof;

a circumferential channel adjacent each end of said half-sleeves between the terminal end edges of said sealing material jacket and the inner edge of said outer compression ring;

each said channel including an inner compression ring adjacent said outer edge of the sealant material jacket and, between said inner and outer compression rings, a floating seal ring with a secondary jacket of sealing material secured thereto;

a plurality of jacking screws located circumferentially in the outer wall of each of the half-sleeves and extending radially inwardly therethrough to engage the outer surface of the floating seal ring.

* * * * *